US009823671B2

(12) United States Patent
Draber et al.

(10) Patent No.: US 9,823,671 B2
(45) Date of Patent: Nov. 21, 2017

(54) THERMOSTATIC CARTRIDGE FOR CONTROLLING HOT AND COLD FLUIDS TO BE MIXED

(71) Applicant: Vernet, Ollainville (FR)

(72) Inventors: Matthieu Draber, Milly la Foret (FR); William Da Silva, Ollainville (FR)

(73) Assignee: VERNET, Ollainville (FR)

( * ) Notice: Subject to any disclaimer, the term of this patent is extended or adjusted under 35 U.S.C. 154(b) by 253 days.

(21) Appl. No.: 14/773,185

(22) PCT Filed: Mar. 6, 2014

(86) PCT No.: PCT/EP2014/054305
§ 371 (c)(1),
(2) Date: Sep. 4, 2015

(87) PCT Pub. No.: WO2014/135614
PCT Pub. Date: Sep. 12, 2014

(65) Prior Publication Data
US 2016/0011606 A1    Jan. 14, 2016

(30) Foreign Application Priority Data

Mar. 7, 2013  (FR) ..................... 13 52064

(51) Int. Cl.
G05D 23/13 (2006.01)
G05D 23/185 (2006.01)
F01P 7/02 (2006.01)

(52) U.S. Cl.
CPC ..... *G05D 23/1346* (2013.01); *G05D 23/1353* (2013.01)

(58) Field of Classification Search
CPC ................. G05D 23/1346; G05D 23/1353
(Continued)

(56) References Cited

U.S. PATENT DOCUMENTS 4,181,252 A * 1/1980 Nolden .............. G05D 23/1353
236/12.11
4,562,953 A * 1/1986 Duprez .............. G05D 23/1333
236/34.5
(Continued)

FOREIGN PATENT DOCUMENTS

| CN | 1038867 | 1/1990 |
|---|---|---|
| FR | 2 940 397 A1 | 6/2010 |

(Continued)

*Primary Examiner* — Henry Crenshaw
(74) *Attorney, Agent, or Firm* — Knobbe, Martens, Olson & Bear, LLP

(57) ABSTRACT

This cartridge comprises a base (10), a fixed attached piece (20), a spool (30) for controlling the temperature of the mixture of the hot and cold fluids, and a thermostatic element making it possible to move the spool along an axis. The base simultaneously delimits an outlet orifice (16) for the mixture, an inlet orifice (14) for the cold fluid that supplies, via a first distribution channel (F4), cold fluid around the spool, a passage (F3), delimited axially between the spool and the base, and an inlet orifice (15) for the hot fluid that supplies, via a second channel (C4) for distribution hot fluid around the spool, a passage (C3) delimited axially between the spool and the attached piece. In order for the base to remain simple and cost-effective to produce, while still favoring the flow of high fluid flow rates through it, the invention proposes to close, axially toward the outlet orifice, the first distribution channel by means of the spool and the second distribution channel by means of the attached piece.

12 Claims, 5 Drawing Sheets

(58) Field of Classification Search
USPC .................. 236/12.11, 12.12, 12.16, 34.5
See application file for complete search history.

(56) References Cited

U.S. PATENT DOCUMENTS

| | | | | |
|---|---|---|---|---|
| 4,653,687 A * | 3/1987 | Weber | ................ | G05D 23/1858 137/625.4 |
| 5,927,597 A * | 7/1999 | Bolgar | ............... | G05D 23/1353 137/625.17 |
| 6,079,625 A * | 6/2000 | Lebkuchner | ....... | G05D 23/1346 236/12.2 |
| 6,315,209 B1 * | 11/2001 | Tripp | ................ | G05D 23/1346 236/12.13 |
| 6,318,638 B1 * | 11/2001 | Banno | ................ | G05D 23/1346 236/12.2 |
| 6,471,132 B1 * | 10/2002 | Knapp | ............... | G05D 23/1346 236/12.2 |
| 7,744,007 B2 * | 6/2010 | Beagen | ................ | G05D 23/134 137/337 |
| 2004/0041034 A1 * | 3/2004 | Kemp | ................ | G05D 23/1393 236/12.12 |
| 2010/0123014 A1 * | 5/2010 | Beagen | ............... | G05D 23/1346 236/12.2 |
| 2010/0314457 A1 * | 12/2010 | Todaka | .................. | F16K 11/07 236/12.16 |
| 2013/0341418 A1 * | 12/2013 | Peel | .......................... | F17D 1/00 236/12.12 |

FOREIGN PATENT DOCUMENTS

| | | |
|---|---|---|
| WO | WO 89/12147 | 12/1989 |
| WO | WO 95/30939 A1 | 11/1995 |
| WO | WO 95/30940 A1 | 11/1995 |
| WO | WO 96/26475 A1 | 8/1996 |
| WO | WO 2010/028790 A2 | 3/2010 |

* cited by examiner

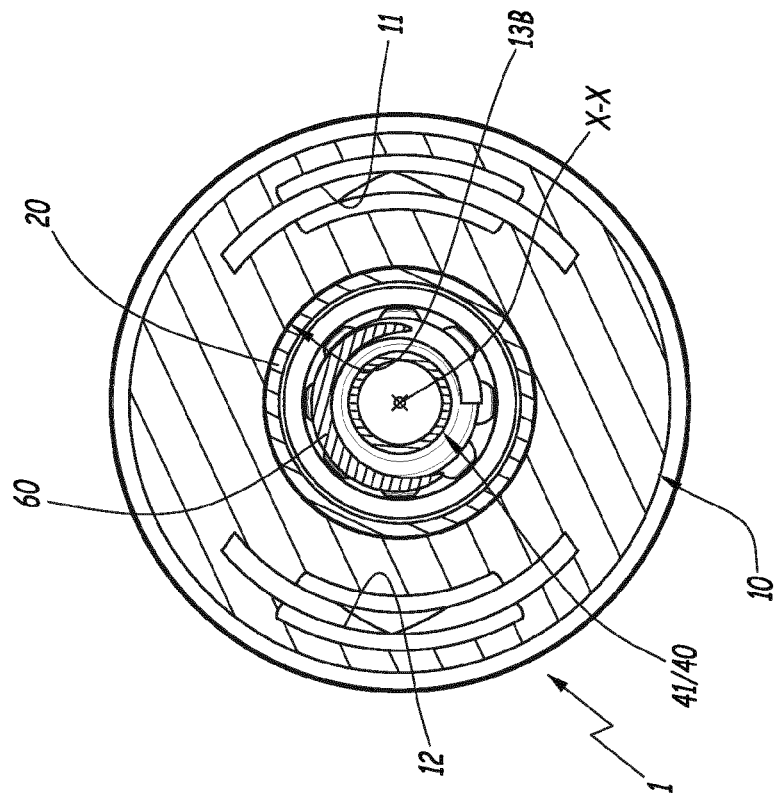
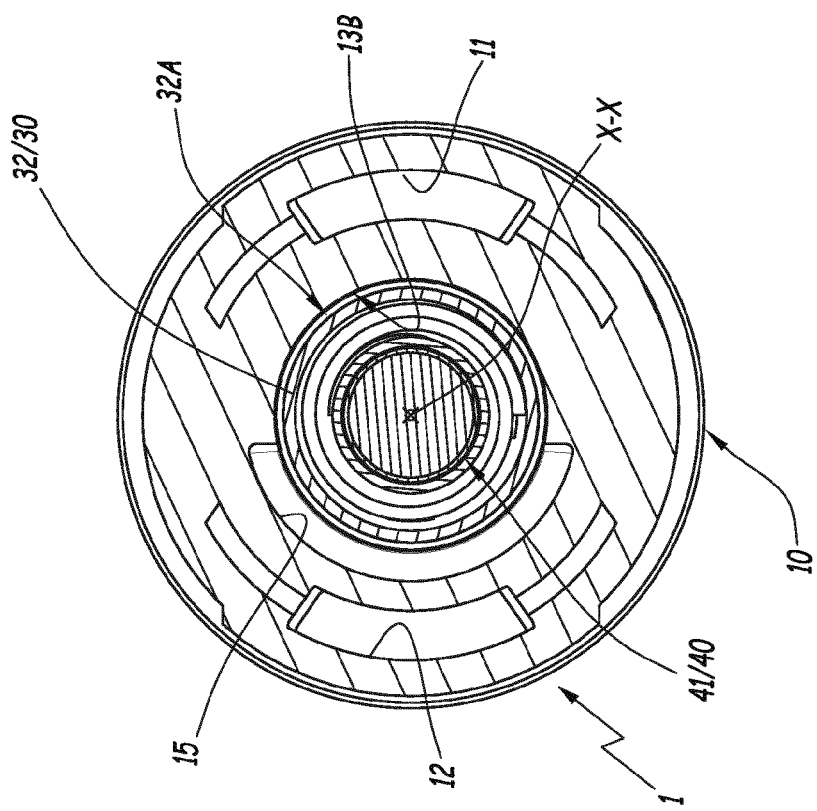

US 9,823,671 B2

THERMOSTATIC CARTRIDGE FOR CONTROLLING HOT AND COLD FLUIDS TO BE MIXED

FIELD OF THE INVENTION

The present invention relates to a thermostatic cartridge for controlling hot and cold fluids to be mixed, in particular hot water and cold water within a sanitation facility.

BACKGROUND OF THE INVENTION

In this type of cartridge, the thermostatic control is obtained using a thermostatic element expandable along an axis, on the one hand comprising a piston that is normally stationary relative to a hollow base of the cartridge, and on the other hand comprising a body rigidly connected to a control spool. This spool is movable along the axis inside the base of the cartridge so as to inversely vary the flow sections of the two fluids, called "hot fluid" and "cold fluid", supplying the base through a first of its axial sides, in order to mix those fluids in variable proportions to obtain, downstream from the spool, a fluid, called "mixed fluid", that flows along a heat-sensitive part of the thermostatic element and leaves the base through its second axial side. By modifying the position of the piston relative to the base, generally using an ad hoc adjusting mechanism, the thermostatic control temperature is set, i.e., the equilibrium temperature around which the temperature of the mixed fluid is controlled. This type of cartridge advantageously incorporates discs for controlling the flow rate of the cold and hot fluids sent toward the spool, those discs being arranged overhanging the first axial side of the basin and being supplied with the cold and hot fluids via flow channels extending from the second side to the first axial side of the base. It is even possible to have only one lever to control both these discs for controlling the flow rate and the aforementioned temperature adjusting mechanism: in that case, the thermostatic cartridge is described as single-control. WO-A-96/26475 provides one example of this.

In practice, the movements of the spool between two extreme positions, for which the flow of hot fluid is completely closed and the flow of cold fluid is completely closed, respectively, are approximately a millimeter, or even less, within standard-sized cartridges. As a result, the maximum flow rates of hot fluid and cold fluid that can be allowed into the base of those cartridges are limited. This limitation of the hot fluid and cold fluid flow rates is accentuated by the fact that the arrival of these fluids at the control spool is concentrated on limited respective portions of the outer periphery of the spool: in fact, the hot and cold fluids are respectively brought to the spool by having to cross through part of the base of the cartridge, while taking into account the more or less restrictive environment in which the base is to be installed. To bypass this difficulty, it is known, for example from the aforementioned document WO-A-96/26475, to hollow, within the base of the cartridge, peripheral grooves for distributing fluid around the spool, the hot fluid and cold fluid intakes respectively emerging in those grooves. However, in practice, this solution tends to reduce the inner diameter of the base in favor of its thickness to hollow the aforementioned grooves therein, which in particular limits the outer diameter of the spool and therefore limits the maximum fluid flow rates that can be controlled by that spool. Furthermore, this solution is expensive to implement, since manufacturing the base is complex: in the event the base is made by molding plastic material, the molding core necessarily has a large diameter to accommodate the presence of retractable pins that are necessary to mold the aforementioned grooves, as well as their junction with the hot fluid and cold fluid intakes.

One alternative to the solution disclosed in WO-A-96/26475 consists of inwardly providing the base with a distributor for the hot and cold fluids, making it possible to orient the fluid coming from the cold fluid inlet, the hot fluid inlet, respectively, toward the spool on its outer perimeter. The base can then be made using a less complex mold for injecting plastic material. However, due to the presence of the distributor, this design requires a larger number of pieces, as well as multiple seals to ensure tightness between those pieces. This solution leads to a more complicated assembly method, since a large number of pieces must be placed and tightness tests must be conducted to verify the presence and performance of the seals.

SUMMARY OF THE INVENTION

The aim of the present invention is to propose a cartridge of the aforementioned type, the base of which remains simple and cost-effective to manufacture, while making it possible to favor the flow of high fluid flow rates.

To that end, the invention relates to a thermostatic cartridge for controlling hot and cold fluids to be mixed, comprising:
  a hollow base, which defines an axis and which delimits both a first inlet orifice for a first of the cold and hot fluids, and a second inlet orifice for the second fluid, and an outlet orifice for a mixture of the cold and hot fluids, the first and second inlet orifices emerging separately on a first axial side of the base while the outlet orifice emerges on a second axial side of the base, axially opposite the first side;
  an attached piece, which is fixedly connected to the base while being arranged inside the outlet orifice, and axially through which the mixture flows;
  a spool for controlling the temperature of the mixture, which:
    has first and second opposite axial faces, turned toward the first axial side and the second axial side of the base, respectively,
    delimits a first passage for the first fluid, said first passage being axially delimited between the first axial face of the spool and the base, supplies the outlet orifice, and is supplied by the first inlet orifice via a first channel for distributing the first fluid around the spool, which runs over at least one portion of the outer periphery of the spool and which is closed, axially toward the second axial side of the base, by the spool,
    delimits a second passage for the second fluid, said second passage being axially delimited between the second axial face of the spool and the attached piece, supplies the outlet orifice, and is supplied by the second inlet orifice via a second channel for distributing the second fluid around the spool, which runs over at least one portion of the outer periphery of the spool and which is closed, axially toward the second axial side of the base, by the attached piece, and
    is moved substantially along the axis inside the base so as to inversely vary the respective flow sections of the first and second passages; and
  a thermostatic element, which includes a piston, connected to the base, and a body fixedly connected to the spool, the piston and the body being movable relative to one another substantially along the axis under the action of the expansion of a thermodilatable material contained in a heat-sensitive part of the body along which the mixture flows. One of the ideas at the base of the invention is to seek to make the hot and cold fluids flow all around the spool, so that those fluids supply the entire periphery of that spool from the inside of the base, all taking advantage of the specific shapes of the spool, the base and a piece fixedly attached in the outlet orifice thereof, having noted that said attached piece advantageously consists of a tubular bearing piece for a return spring associated with the thermostatic element of the cartridge. According to the invention, rather than the cold fluid and hot fluid distribution channels, which completely surround the spool, being delimited axially only by the base while giving those channels a groove shape as cited above, one of those distribution channels is axially downwardly closed, i.e., toward the axial side on which the outlet orifice emerges for mixing the cold and hot fluids, directly by the spool, more specifically directly by a dedicated part of the latter, configured in an ad hoc manner, while the other distribution channel is axially downwardly closed directly by the aforementioned attached piece. It will be understood that these distribution channels can then be dimensioned in an extended manner, both from the central axis of the base, each distribution channel advantageously being able to run over 360° around the axis, and radially to that axis, taking advantage of the radial thickness of the aforementioned dedicated part of the spool and the tubular wall of the attached piece. As a result, strong cold and hot fluid flow rates can flow through the base up to the spool. When the base is made by molding a plastic material, the molding constraints are reduced, since it is possible to avoid undercuts for molding the distribution channels and, advantageously, their junction with the inlet orifices for the cold and hot fluids: without using pins retractable in the molding core, it is advantageously possible for the base to be axially stripped upward, naturally.

According to additional advantageous features of the cartridge according to the invention, considered alone or according to any technically possible combination:
the spool includes, along the axis, a first terminal part and a second terminal part, which are axially opposite one another and which respectively bear the first and second axial faces, and an intermediate part that connects the first and second terminal parts to one another; and the base inwardly has:
a first substantially cylindrical surface, which is substantially centered on the axis, on which the first inlet orifice emerges radially, between which and the first terminal part of the spool the first distribution channel is radially delimited, and against which the intermediate part of the spool bears radially and moves axially tightly, and
a second substantially cylindrical surface, which is substantially centered on the axis, on which the second inlet orifice emerges radially, between which and the second terminal part of the spool the second distribution channel is radially delimited, and inside which the attached piece is arranged in a substantially adjusted manner, the diameter of the first substantially cylindrical surface being strictly smaller than the diameter of the second substantially cylindrical surface;
the first substantially cylindrical surface extends axially over the entire axial dimension of the first distribution channel;
the second substantially cylindrical surface extends axially over the entire axial dimension of the second distribution channel;
the first terminal part of the spool has, over substantially the entire axial expanse of the first terminal part, a substantially cylindrical outer face, which is substantially centered on the axis and the diameter of which is substantially smaller than the diameter of the first substantially cylindrical surface of the base;
the second terminal part of the spool has, over substantially the entire axial expanse of the second terminal part, a substantially frustoconical outer face, which is substantially centered on the axis and which diverges toward the second axial side of the base;
the first inlet orifice and the second inlet orifice extend, around the axis, over approximately 180° and in a diametrically opposite manner;
the first distribution channel extends, around the axis, over 360°;
the second distribution channel extends, around the axis, over 360°;
the cartridge further comprises a return spring, which acts on the body of the thermostatic element opposite the action of the expansion of the thermodilatable material, and which, opposite that body, bears axially against the attached piece;
the attached piece is screwed into a thread of the base;
the base further delimits a first flow channel for the first fluid from the second axial side to the first axial side of the base, and a second flow channel for the second fluid from the second axial side to the first axial side of the base; and the cartridge further comprises means for controlling the flow rate and the temperature of the mixture, which are suitable both for modifying the axial position of the piston of the thermostatic element relative to the base and for adjustably placing both the first flow channel in communication with the first inlet orifice and the second flow channel in communication with the second inlet orifice.

BRIEF DESCRIPTION OF THE DRAWINGS

The invention will be better understood upon reading the following description, provided solely as an example and done in reference to the drawings, in which:
FIG. 4, FIG. 5, FIG. 6 and FIG. 7 are sectional views respectively along lines IV-IV, V-V, VI-VI and VII-VII of FIG. 3.

DETAILED DESCRIPTION OF CERTAIN EMBODIMENTS

FIGS. 1 to 7 show a thermostatic cartridge 1 that is arranged around and along a central axis X-X. This cartridge is suitable for equipping a faucet mixing hot water and cold water, not shown as such in the figures, or more generally, for equipping a sanitary facility.

Figure 3:
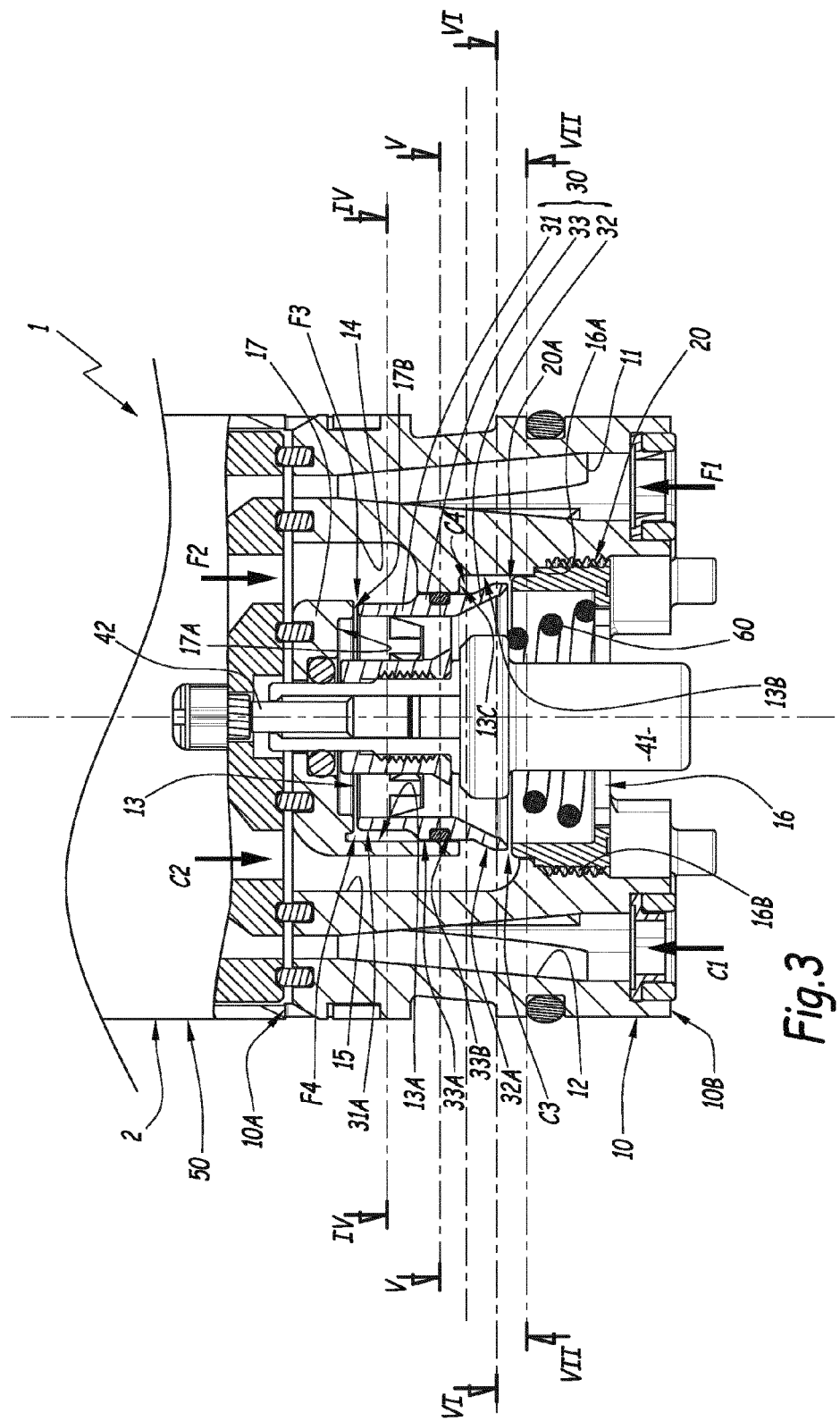
FIG. 3 is a partial longitudinal sectional view of the cartridge of FIG. 1 in the assembled state.

For convenience, the rest of the description is oriented relative to the axis X-X, considering that the terms "upper" and "top" correspond to an axial direction turned toward the upper part of FIG. 3, while the terms "lower" and "bottom" correspond to an axial direction in the opposite direction.

The thermostatic cartridge 1 includes an upper housing 2 and a lower base 10, which, in the assembled state of the cartridge, are fixedly assembled to one another.

The base 10 has a globally cylindrical outer shape, centered on the axis X-X and with a circular base. As clearly shown in FIG. 3, the base 10 delimits, over its entire axial dimension, a cold water flow channel 11 and a hot water flow channel 12, each of those channels connecting the upper side 10A and the lower side 10B of the base 10 to one another, emerging freely on those upper and lower sides.

The base 10 also delimits an inner chamber 13, which is substantially centered on the axis X-X, as well as a cold water inlet orifice 14 and a hot water inlet orifice 15, which, at their upper end, emerge on the upper side 10A of the base 10, while, at their lower end that is situated along the direction of the axis X-X, in an intermediate part of the base 10, the inlet orifices 14 and 15 emerge in the chamber 13.

Figure 4:
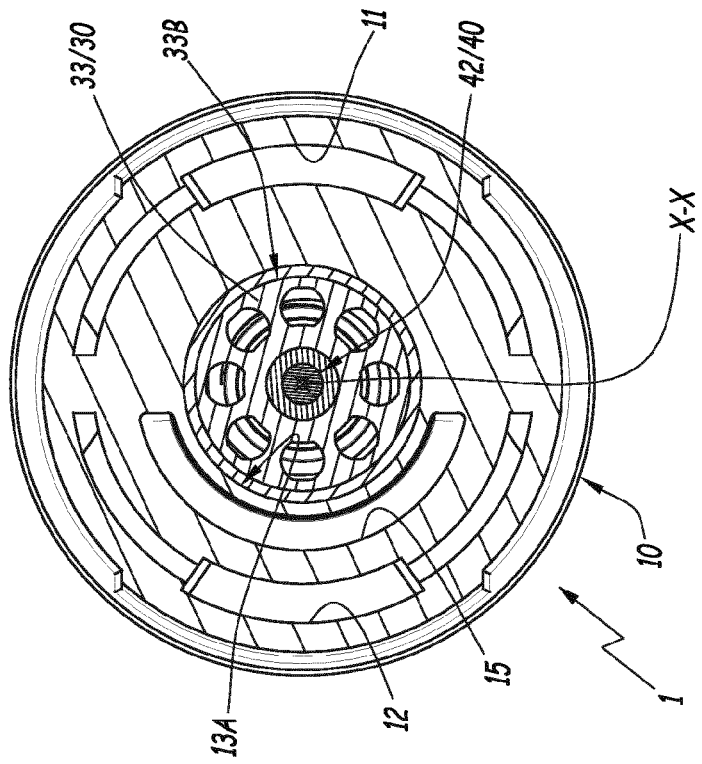
Figure 5:
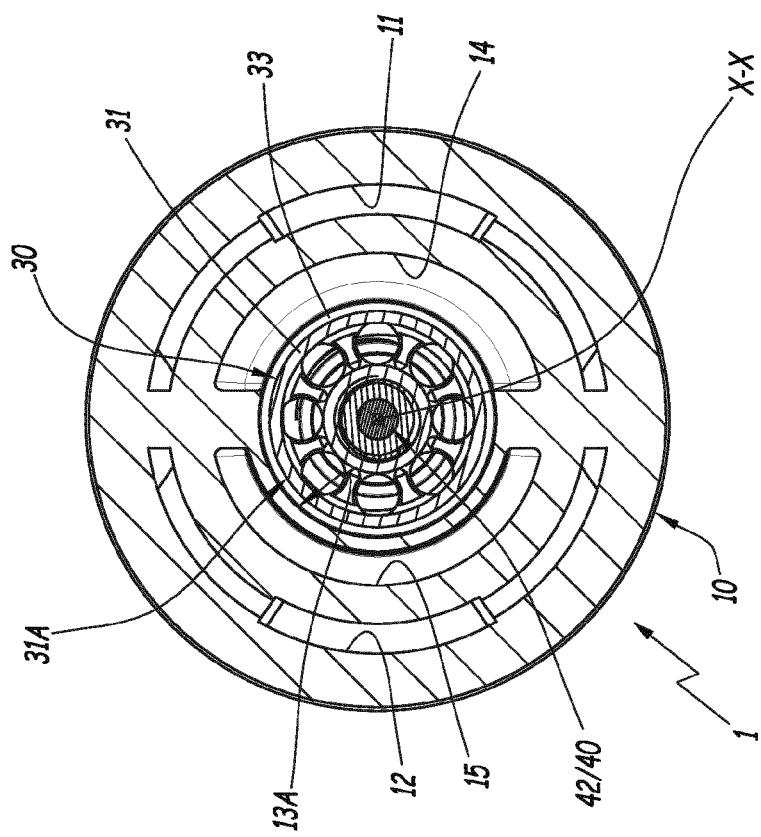

As clearly shown in FIGS. 3 and 4, the flow channels 11 and 12 and the inlet orifices 14 and 15 are angularly and radially positioned relative to the axis X-X so as not to communicate directly with one another. During use, the flow channels 11 and 12 are provided to be respectively supplied with cold water and hot water, from the lower side 10B of the base 10, as indicated by arrows F1 and C1 in FIG. 3. Additionally, after having left the base 10 through its upper side 10A and having flowed inside the housing 2 as mentioned in slightly more detail later, this cold water and this hot water are turned back, from the inside of the housing 2, toward the upper side 10A of the base 10 so as to respectively supply the inlet orifices 14 and 15, as indicated by arrows F2 and C2 in FIG. 3. This cold water and hot water, flowing downwardly in the inlet orifices 14 and 15, respectively, next supply the chamber 13 in which they mix in the form of mixed water which, as indicated by an arrow M in FIG. 3, is discharged from the chamber 13 via a mixing outlet orifice 16, which is delimited by the base 10, while being centered on the axis X-X, so as to place the chamber 13 in free fluid communication with the outside of the base, emerging on the lower side 10B of the latter.

Advantageously, in particular to favor the cold water and hot water flow rates respectively flowing in the inlet orifices 14 and 15, those inlet orifices 14 and 15 each extend over approximately 180° around the axis X-X, while being diametrically opposite one another, as clearly shown in FIG. 4.

Figure 1:
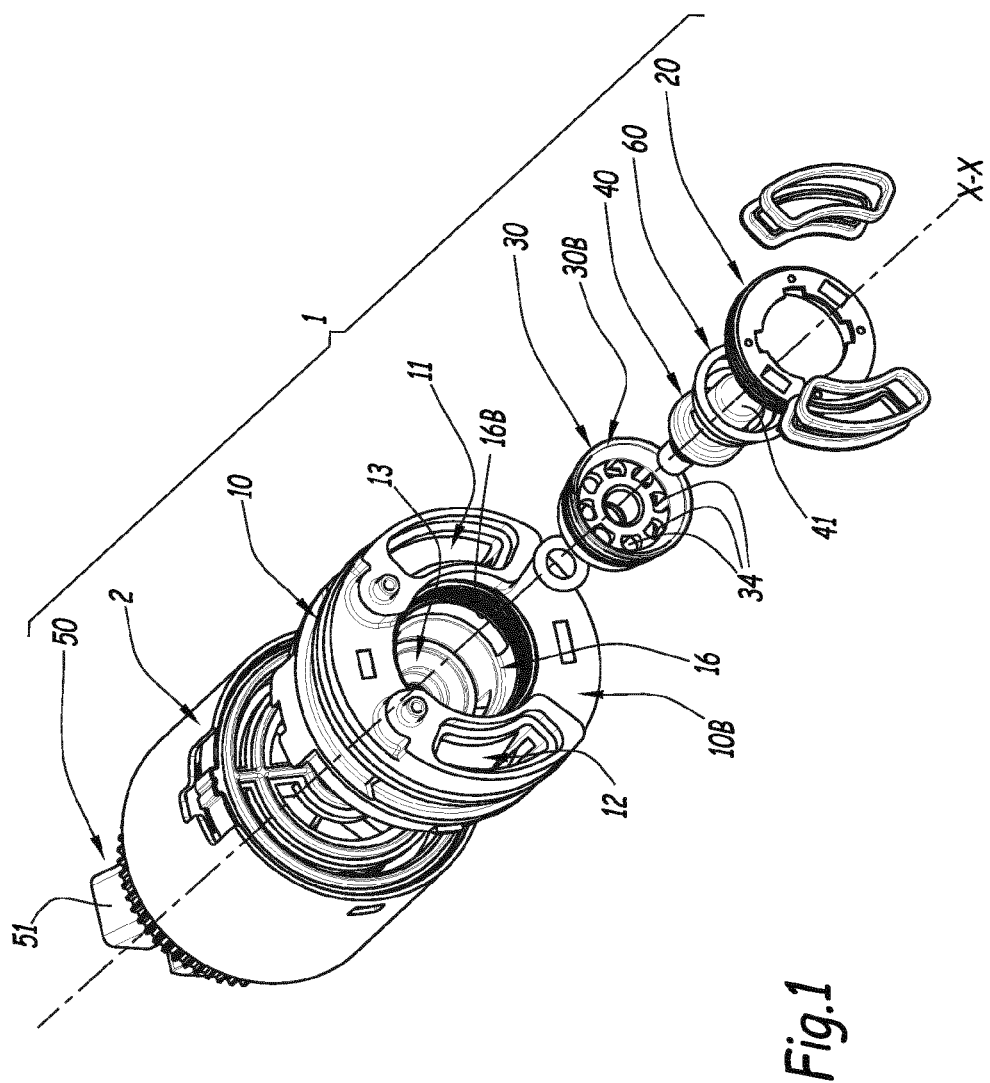
FIG. 1 is an exploded perspective view of a thermostatic cartridge according to the invention.

As shown in FIG. 1 and as shown in more detail in FIGS. 3 to 7, the inner chamber 13 of the base 10 is stepped in the direction of the axis X-X, while being more radially extended downward. More specifically, in its upper terminal axial part, the chamber 13 is delimited by a cylindrical surface 13A, which is centered on the axis X-X, which has a circular base, and which extends axially downward from the outer periphery of the lower surface 17A of a wall 17 belonging to the upper part of the base 10, that wall 17 axially closing the chamber 13 upwardly. As clearly shown in FIGS. 3 and 5, the lower terminal part of the cylindrical surface 13A extends, around the axis X-X, over 360°, while, as clearly shown in FIGS. 3 and 4, the upper terminal part of the cylindrical surface 13A does not extend over 360° around the axis X-X, but is interrupted around that axis, and in the angular portion of the base 10 in which the cold water inlet orifice 14 extends: in other words, at the axial level of the base 10 where both the upper terminal part of the cylindrical surface 13A and the lower end of the inlet orifice 14 are situated, that inlet orifice 14 emerges radially on the cylindrical surface 13A, which amounts to saying that, around the axis X-X, the upper terminal part of the cylindrical surface 13A and the outlet of the inlet orifice 14 follow one another, each extending over approximately 180°.

Advantageously, as in the embodiment considered in the figures, the outer peripheral part of the lower surface 17A of the closing wall 17, from which the cylindrical surface 13A extends, extends in a geometric plane substantially perpendicular to the axis X-X.

In its lower terminal axial part, the chamber 13 is delimited by a cylindrical surface 13B, which is centered on the axis X-X, which has a circular base and which has a diameter strictly larger than that of the cylindrical surface 13A. In the example embodiment considered in the figures, the cylindrical surfaces 13A and 13B are connected to one another by a stepped surface 13C, which is advantageously substantially fitted in a plane perpendicular to the axis X-X. As clearly shown in FIGS. 3 and 7, the lower terminal part of the cylindrical surface 13B extends, around the axis X-X, over 360°, whereas, as clearly shown in FIGS. 3 and 6, the upper terminal part of this cylindrical surface 13B is interrupted around the axis X-X, in the angular portion of the base 10 in which the hot water inlet orifice 15 extends. Thus, at the axial level of the base 10 where both the upper terminal part of the cylindrical surface 13B and the lower end of the inlet orifice 15 are situated, that inlet orifice 15 emerges radially on the cylindrical surface 13B, which effectively means that, around the axis X-X, the upper terminal part of the cylindrical surface 13B and the outlet of the orifice 15 follow one another, each extending over approximately 180°.

As indicated above, at its lower end, the chamber 13 emerges axially in the mixing outlet orifice 16. More specifically, as shown in FIG. 3, this outlet orifice 16 has a diameter strictly larger than that of the cylindrical surface 13B of the chamber 13, such that said cylindrical surface 13B is connected to the outlet orifice 16 by a stepped surface 16A that is situated at the upper end of the outlet orifice 16 and that, in the example embodiment considered here, fits into a plane substantially perpendicular to the axis X-X.

Figure 2:
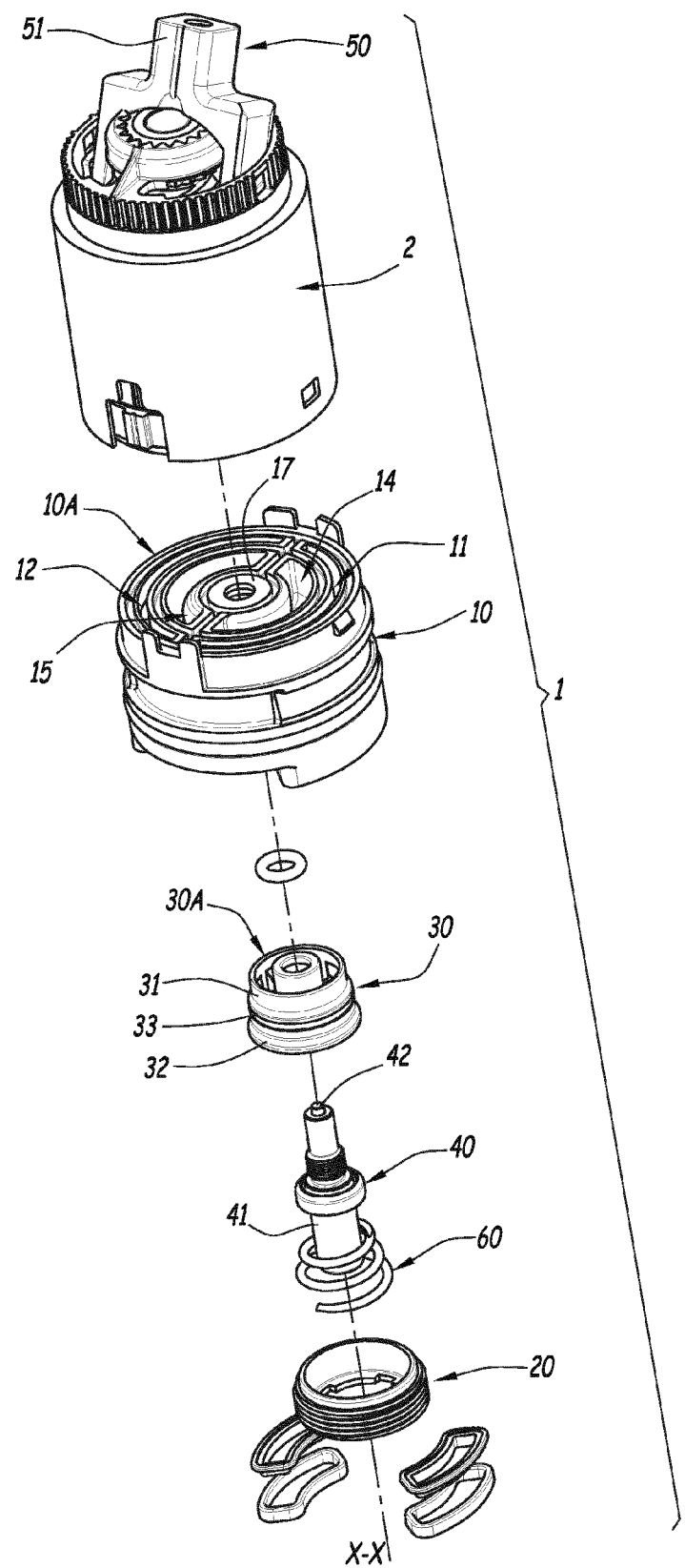
FIG. 2 is a view similar to FIG. 1, from another viewing angle.

Furthermore, also as shown in FIG. 3 and as clearly shown in FIG. 2, the inside of the outlet orifice 16 is tapped, the corresponding thread 16B being substantially centered on the axis X-X and extending from the lower end of the outlet orifice 16 toward its upper end. In the assembled state of the cartridge 1, an attached piece 20 is fixedly received inside the orifice 16, while being screwed in the thread 16B, until it abuts axially upwardly against the stepped surface 16A. As shown in FIG. 3, the upper terminal axial part of the attached piece 20 is then arranged inside the lower part of the chamber 13, while being received in a substantially adjusted manner inside the cylindrical surface 13B, as clearly shown in FIG. 7.

In practice, the attached piece 20 has a globally tubular shape, thus inwardly delimiting a free volume for the flow of the mixture from the upper end to the lower end of that attached piece 20. In other words, during use, the attached piece 20 is axially crossed, through the inside, by the mixture of cold water and hot water coming from the chamber 13.

Before describing the other components of the cartridge 1, it will be noted that the stepped shape of the inner chamber 13 of the base 10, described in detail above, allows the base to be obtained easily by molding plastic, in particular injected plastic. Indeed, during the manufacture of the base 10 by molding, a molding core can advantageously be provided to occupy the chamber 13 such that, without using a retractable molding pin, the stripping of the base 10 consists of downwardly unscrewing the core, that stripping being particularly easy without any undercut.

The thermostatic cartridge 1 also includes a spool 30 which, as clearly shown in FIGS. 1 and 2, has a globally tubular shape, with a circular base and centered on an axis which, in the assembled state of the cartridge, is aligned with the axis X-X. Consequently, for convenience, the rest of the description of the spool 30 is oriented relative to the axis X-X.

As clearly shown in FIG. 3, the spool 30 includes, along the axis X-X:
- an upper terminal part 31 having a cylindrical outer face 31A, centered on the axis X-X, with a circular base and having a diameter strictly smaller than the diameter of the cylindrical surface 13A of the chamber 13;
- a lower terminal part 32 having an outer face 32A that is substantially frustoconical, centered on the axis X-X, with a circular and downwardly divergent base; and
- an intermediate part 33, which connects the upper 31 and lower 32 terminal parts to one another and has a substantially cylindrical outer face 33A, which is centered on the axis X-X, which has a circular base, which has a diameter substantially equal to that of the cylindrical surface 13A, and inside which a peripheral groove 33B is hollowed inside which a sealing gasket is received.

The spool 30 is mounted on the base 10, more specifically inside its inner chamber 13, movably along the axis X-X between two extreme positions, i.e.:
- an upper extreme position, in which the upper face 30A of the spool 30 bears against an annular seat 17B, which is secured to the base 10, while being supported by the lower surface 17A of the closing wall 17, having noted that, in the example embodiment considered here, this seat 17B is provided slightly downwardly axially protruding from the rest of the lower surface 17A of the closing wall 17, and
- a lower extreme position, in which the lower face 30B of the spool 30 bears against an annular seat 20A, which is secured to the attached piece 20, while being delimited by the upper end edge of that attached piece 20.

In as much as the total axial dimension of the spool 30, separating its opposite faces 30A and 30B from one another, is smaller than the axial distance separating the seats 17B and 20A from one another, it will be understood that, when the spool 30 is in its lower extreme position, the spool closes off the intake of hot water inside the seat 20A, while maximally opening a cold water passage F3, which is axially delimited between the upper face 30A of the spool 30 and the seat 17B. Conversely, when the spool 30 is in its upper extreme position, the spool closes off the intake of cold water inside the seat 17B, while maximally opening a hot water passage C3 that is axially delimited between the lower face 30B of the spool 30 and the seat 20A. Of course, depending on the position of the spool 30 along the axis X-X between its upper and lower extreme positions, the respective flow sections of the cold water passage F3 and the hot water passage C3 vary inversely, which means that the quantities of cold water and hot water allowed inside the seats 17B and 20A are controlled, in inverse respective proportions, by the spool 30 depending on its axial position. In FIG. 3, the spool 30 occupies an intermediate axial position between its upper and lower extreme positions.

To ensure guiding of the movable assembly of the spool 30 in the chamber 13 of the base 10, the intermediate part 33 of the spool 30 is received in a substantially adjusted manner inside the lower terminal part of the cylindrical surface 13A of the chamber 13, with radial interposition of the sealing gasket housed in the groove 33B of the intermediate part 33 of the spool 30.

Above the sliding and tight bearing zone of the spool 30 against the lower terminal part of the cylindrical surface 13A of the chamber 13, a channel F4 is provided for distributing cold water on the spool 30. More specifically, this cold water distribution channel F4 is axially delimited on top by the base 10, and on bottom by the spool 30, i.e., this channel F4 is axially upwardly closed by the outer peripheral part of the lower surface 17A of the closing wall 17 of the base 10, while said channel F4 is axially downwardly closed by the spool 30, more specifically by the junction between its upper 31 and intermediate 33 parts, as clearly shown in FIG. 3. Furthermore, as clearly shown in FIGS. 3 and 4, the cold water distribution channel F4 is radially inwardly closed by the upper part 31 of the spool 30, more specifically by its cylindrical outer face 31A. Additionally, radially outwardly, the cold water distribution channel F4 is on the one hand closed by the upper terminal part of the cylindrical surface 13A in the angular portion of the base 10 in which that upper terminal part of the cylindrical surface 13A extends, and on the other hand in free fluid communication with the lower outlet of the cold water inlet orifice 14 in the remaining angular portion of the base 10. Thus, the cold water distribution channel F4 extends, around the axis X-X, over 360°, without interruption, with the understanding that, as an alternative that is not shown, a smaller circumferential expanse can be considered. Owing to this channel F4, the cold water leaving the orifice 14 toward the spool 30 is channeled all around the upper part 31 of that spool, from which the cold water can supply the cold water passage F3 over its entire periphery: at any point of the outer periphery of the spool 30, the supply of cold water for the passage F3 by the distribution channel F4 is effective and homogenous, both radially across from the lower outlet of the inlet orifice 14 and outside that outlet along the periphery of the base 10. It is thus possible to allow the largest amount of cold water inside the seat 17B, for a given axial position of the spool 30.

In practice, to seek to saturate the passage F3 with cold water when a sufficient cold water flow rate supplies the orifice 14 from the outside of the cartridge, typically under normal supply conditions of the cartridge, the cylindrical surface 13A extends axially over the entire axial dimension of the cold water distribution channel F4, as is also the case for the example embodiment considered in the figures.

Likewise, below the sliding and tight bearing zone of the spool 30 against the lower terminal part of the cylindrical surface 13A of the chamber 13, a channel C4 is provided for distributing hot water around the spool 30. More specifically, as shown in FIGS. 3 and 6, this hot water distribution channel C4 is axially delimited between the base 10 and the attached piece 20, i.e., this distribution channel C4 is closed, axially upwardly, by the stepped surface 13C, and closed, axially downwardly, by the upper terminal part of the attached piece 20. Radially inwardly, the distribution channel C4 is closed by the lower part 32 of the spool 30, more specifically by its frustoconical outer face 32A. Furthermore, radially outwardly, the distribution channel C4 is on the one hand closed by the upper terminal part of the cylindrical surface 13B in the angular portion of the base 10 in which that upper terminal part of the surface 13B extends, and on the other hand in free fluid communication with the lower outlet of the hot water inlet orifice 15 in the remaining angular portion of the base. It will be understood that all of the preceding considerations related to the cold water distribution channel F4 can be transposed to the hot water distribution channel C4: in other words, the hot water flowing in the inlet orifice 15 flows in the hot water distribution channel C4, while being distributed all around the spool 30, so as to distribute the supply from the hot water passage C3 over the entire outer periphery of the spool. Additionally, advantageously, to seek to saturate the passage C3 with hot water, the cylindrical surface 13B extends axially over the entire axial dimension of that hot water distribution channel C4, as in the example embodiment considered in the figures.

It will be noted that, in order for the cold water allowed inside the seat 17B to be able to reach and mix with the hot water allowed inside the seat 20A, then forming the aforementioned mixture of cold water and hot water flowing, downstream from the spool, to the outlet orifice 16, the spool 30 inwardly delimits one or more flow passages 34 connecting its opposite faces 30A and 30B to one another. This or these flow passage(s) 34 are not limiting on the present invention and will therefore not be described in more detail.

To drive the movement of the spool 30 and thus control its axial position, the thermostatic cartridge 1 includes a thermostatic element 40 whereof the body 41, which is centered on the axis X-X in the assembled state of the cartridge, is fixedly secured to the spool 30. A heat-sensitive part of that body 41 contains a thermodilatable material which, under the action of the heat from the mixture of hot water and cold water, flowing downstream from the spool 30 along that heat-sensitive part of the body 41, extends and causes the relative movement, in translation along the axis X-X, of a piston 42 of the thermostatic element 40, that piston 42 itself also being substantially centered on the axis X-X in the assembled state of the cartridge.

The terminal part of the piston 42 opposite the body 41, in other words the upper terminal part of the piston 42, is connected to the base 10 by a mechanical assembly 50, which is housed inside the housing 2 and which, in a known manner, is able to adjust the axial altitude of the piston 42 relative to the base 10, independently of the relative position of the body 41: this means that this mechanical assembly 50 is designed to control the temperature of the mixture of cold water and hot water leaving the base 10, by adjusting the thermostatic equilibrium temperature around which the temperature of the mixture is controlled. Inasmuch as the embodiment of the mechanical assembly 50 is not limiting on the present invention, this mechanical assembly 50 is not shown in detail in the figures and will not be described in more detail here, having nevertheless noted that, in the example embodiment considered in the figures, this mechanical assembly 50 is advantageously suitable for also controlling the flow rate of the mixture of cold water and hot water leaving the base 10, by adjusting, typically using ceramic discs, the placement in communication of the cold water flow channel 11 with the cold water inlet orifice 14 and the placement in the communication of the hot water flow channel 12 with the hot water inlet orifice 15. Preferably and as is also the case for the example embodiment considered in the figures, the mechanical assembly 50 includes a single lever 51 allowing the user to control the flow rate and temperature of the mixture. In this respect, the reader may refer, for example, to prior art document WO-A-2010/072966, in the same applicant's name as this document.

The thermostatic cartridge 1 further includes a compression spring 60, which acts on the spool 30 so as to oppose the deployment of the piston 42 relative to the body 41 of the thermostatic element 40, and which is axially inserted between that spool and the attached piece 20, as clearly shown in FIG. 3. It will must be understood that the attached piece 20 combines the fixed bearing function for the spring 60, allowing the latter to return the piston 42 to the inside of the body 41 during a contraction of the thermodilatable material of the thermostatic element 40, the fixed bearing seat function for the spool 30 when the latter is in its lower extreme position, and the downward axial closing function of the hot water distribution channel C4.

Of course, the invention is not limited to the embodiment described above and illustrated, various alternatives and options being able to be considered without going beyond the scope of this invention. For example:
  rather than having an essentially frustoconical outer shape, the lower terminal part 32 of the spool 30 can be provided to be outwardly cylindrical, having nevertheless noted that the frustoconical shape has the advantage of allowing a greater flow rate through the cartridge 1 and contributes to facilitating stripping of the base; and/or
  rather than being screwed, the attached piece 20 can be clipped or welded or glued to the base 10, or forcibly fitted in the base.

The invention claimed is:
1. A thermostatic cartridge for controlling cold and hot fluids to be mixed, comprising:
  a hollow base, which defines an axis and which delimits both a first inlet orifice for a first of the cold and hot fluids, and a second inlet orifice for the second fluid, and an outlet orifice for a mixture of the cold and hot fluids, the first and second inlet orifices emerging separately on a first axial side of the base while the outlet orifice emerges on a second axial side of the base, axially opposite the first side;
  an attached piece, which is fixedly connected to the base while being arranged inside the outlet orifice, and axially through which the mixture flows;
  a spool for controlling the temperature of the mixture, which:
    has first and second opposite axial faces, turned toward the first axial side and the second axial side of the base, respectively,
    delimits a first passage for the first fluid, said first passage being axially delimited between the first axial face of the spool and the base, supplies the outlet orifice, and is supplied by the first inlet orifice via a first channel for distributing the first fluid around the spool, which runs over at least one portion of the outer periphery of the spool and which is closed, axially toward the second axial side of the base, by the spool,
    delimits a second passage for the second fluid, said second passage being axially delimited between the second axial face of the spool and the attached piece, supplies the outlet orifice, and is supplied by the second inlet orifice via a second channel for distributing the second fluid around the spool, which runs over at least one portion of the outer periphery of the spool and which is closed, axially toward the second axial side of the base, by the attached piece, and
    is moved substantially along the axis inside the base so as to inversely vary the respective flow sections of the first and second passages; and
  a thermostatic element, which includes a piston, connected to the base, and a body fixedly connected to the spool, the piston and the body being movable relative to one another substantially along the axis under the action of the expansion of a thermodilatable material contained in a heat-sensitive part of the body along which the mixture flows.

2. The cartridge according to claim 1, wherein the spool includes, along the axis:
   a first terminal part and a second terminal part, which are axially opposite one another and which respectively bear the first and second axial faces, and
   an intermediate part that connects the first and second terminal parts to one another;
   and wherein the base inwardly has:
   a first substantially cylindrical surface, which is substantially centered on the axis, on which the first inlet orifice emerges radially, between which and the first terminal part of the spool the first distribution channel is radially delimited, and against which the intermediate part of the spool bears radially and moves axially tightly, and
   a second substantially cylindrical surface, which is substantially centered on the axis, on which the second inlet orifice emerges radially, between which and the second terminal part of the spool the second distribution channel is radially delimited, and inside which the attached piece is arranged in a substantially adjusted manner,
   the diameter of the first substantially cylindrical surface being strictly smaller than the diameter of the second substantially cylindrical surface.

3. The cartridge according to claim 2, wherein the first substantially cylindrical surface extends axially over the entire axial dimension of the first distribution channel.

4. The cartridge according to claim 2, wherein the second substantially cylindrical surface extends axially over the entire axial dimension of the second distribution channel.

5. The cartridge according to claim 2, wherein the first terminal part of the spool has, over substantially the entire axial expanse of the first terminal part, a substantially cylindrical outer face, which is substantially centered on the axis and the diameter of which is substantially smaller than the diameter of the first substantially cylindrical surface of the base.

6. The cartridge according to claim 2, wherein the second terminal part of the spool has, over substantially the entire axial expanse of the second terminal part, a substantially frustoconical outer face, which is substantially centered on the axis and which diverges toward the second axial side of the base.

7. The cartridge according to claim 1, wherein the first inlet orifice and the second inlet orifice extend, around the axis, over 180° and in a diametrically opposite manner.

8. The cartridge according to claim 1, wherein the first distribution channel extends, around the axis, over 360°.

9. The cartridge according to claim 1, wherein the second distribution channel extends, around the axis, over 360°.

10. The cartridge according to claim 1, wherein the cartridge further comprises a return spring, which acts on the body of the thermostatic element opposite the action of the expansion of the thermodilatable material, and which, opposite that body, bears axially against the attached piece.

11. The cartridge according to claim 1, wherein the attached piece is screwed into a thread of the base.

12. The cartridge according to claim 1, wherein the base further delimits:
   a first flow channel for the first fluid from the second axial side to the first axial side of the base, and
   a second flow channel for the second fluid from the second axial side to the first axial side of the base;
   and wherein the cartridge further comprises means for controlling the flow rate and the temperature of the mixture, which are suitable both for modifying the axial position of the piston of the thermostatic element relative to the base and for adjustably placing both the first flow channel in communication with the first inlet orifice and the second flow channel in communication with the second inlet orifice.

* * * * *